(No Model.)
J. P. WELLER.
TIRE FOR VEHICLE WHEELS.
No. 276,943.  Patented May 1, 1883.
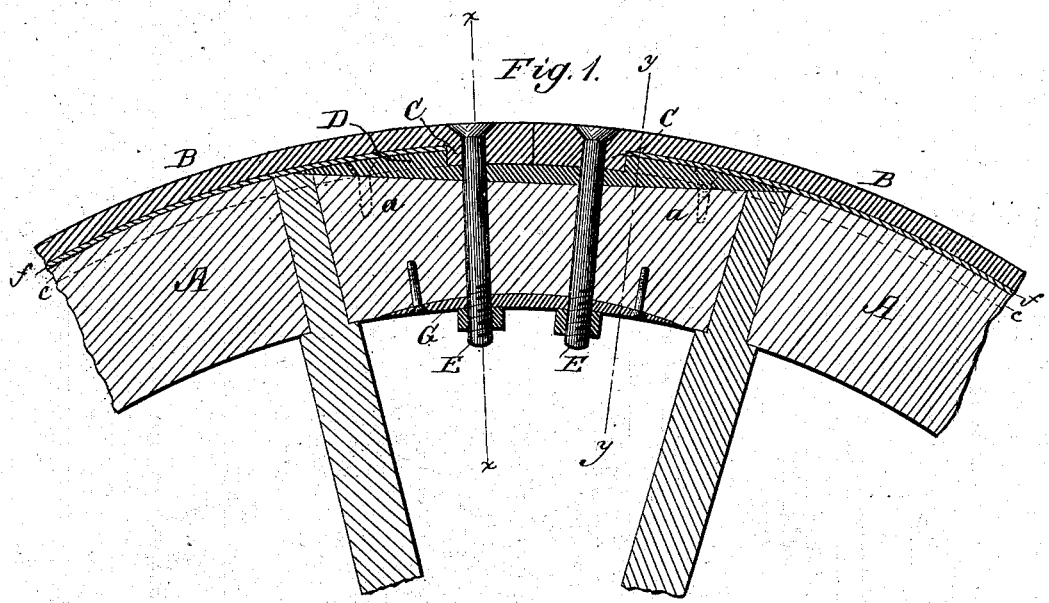
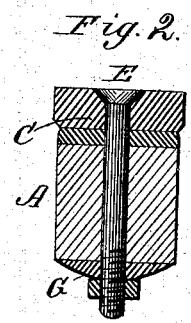
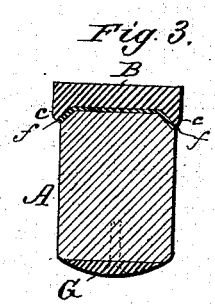
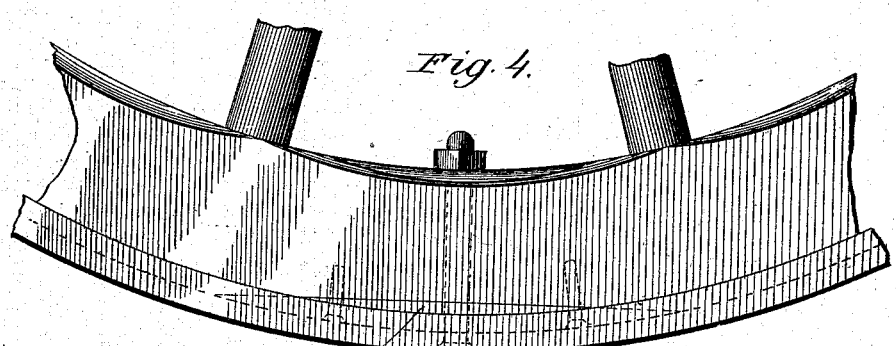
WITNESSES:
Fred. G. Dieterich,
W. X. Stevens
INVENTOR:
J. P. Weller
BY
ATTORNEYS.

UNITED STATES PATENT OFFICE.

JACOB P. WELLER, OF ST. LOUIS, MISSOURI.

TIRE FOR VEHICLE-WHEELS.

SPECIFICATION forming part of Letters Patent No. 276,943, dated May 1, 1883.

Application filed October 28, 1882. (No model.)

*To all whom it may concern:*

Be it known that I, JACOB P. WELLER, a citizen of the United States, residing in the city of St. Louis, and State of Missouri, have invented a new and Improved Vehicle-Wheel, of which the following is a specification.

My invention relates more particularly to the tires of wheels and the mode of securing them; and it has for its object to provide a tire which shall have great stiffness and strength relative to its weight, that shall support the fellies against lateral strain, and that shall be easily and securely held upon the wheel, and to provide means whereby a common laborer may reset the tire to tighten the same when it becomes loose.

To this end my invention consists in the construction and combination of the tire and other parts of a vehicle-wheel, hereinafter described and claimed, reference being had to the accompanying drawings, in which—

Figure 1 is a longitudinal vertical section, part in elevation, showing my method of joining and securing the tire. Fig. 2 is a transverse vertical section at $x\,x$, Fig. 1. Fig. 3 is a similar section at $y\,y$, Fig. 1; and Fig. 4 is an elevation of that portion of the wheel opposite the tire-joint.

A represents the felly of the wheel, chamfered at its outer corners to wedge closely into the tire B. The tire is made of angle-iron, having an inwardly-projecting flange, $c$, at each edge to fit snugly over the sides of the felly. In common buggy-wheels these flanges should be about one-eighth of an inch thick in the direction of the wheel-axle, and about one-quarter of an inch radially, and larger in heavier wheels. These flanges serve to stiffen the tire, to stiffen the wheel in all directions, to keep the fellies from being driven out of the tire by local strain, and to protect the sides of the fellies from wear or accident. The tire may be made in one or two pieces, joined, as shown in Fig. 1.

C represents a block of iron filling the trough between the flanges at each end of the tire, and firmly secured to the tire, to become a part thereof, by welding or otherwise.

D is a piece of metal secured by means of screws $a$ to the outer edge of the felly, on a spot made to fit it, and gained across its outer face to receive the blocks C of the ends of the tire. In making the iron for the tires it is rolled to leave the two flanges standing on one face at the edges, in the manner usual for making troughed angle-iron. For very heavy tires of small diameter—such as are used for dray-wheels—the tires may be cut to length, or a little longer to allow for finish, and bent into circles on suitable rollers at the mill while yet hot. The blocks C are secured to the tire in any usual manner to fill the trough and serve as hooks to fit into the gain in piece D to hold the circumferential strain on the tire.

E E are two screw-bolts, one in each end of the tire, extending through the felly and through an inner clip, G, secured, as usual, to the felly. By means of these bolts the ends of the felly are drawn tightly down upon piece D, and the hooks C are firmly held in the gain.

In practice the ends of the tire will be trimmed to form a neat joint, at the same time having the sum of the widths of the two blocks C to exactly correspond to the width of the gain in piece D. Should it be desired to form a very perfect joint, the ends of the tire may be heated and slightly upset, when the ends are brought together on the wheel and secured. The material so upset may be hammered down to wholly conceal the joint. The metallic piece D will be long enough and thick enough to compensate in strength for the wood which has been cut away from the felly to admit said piece within the arc of the circle beneath the tire, and to compensate for the weakening of the wheel by the cut or joint of the tire. To balance this piece D, I place a similar piece, D', on the opposite side of the wheel, and secure it in a similar manner; but the piece D' used for this purpose is not gained, for the tire is whole and has no blocks to require a gain to rest in; but it may be found advantageous in some cases to make the tire in two parts, in which case the joint and its accessories (shown in Fig. 1) will be duplicated.

In course of time all wooden wheels shrink, thus leaving the tire loose. When this occurs with my wheel the tire may be taken off by any one, one or more strips of paper, cloth, leather, or other sheet material may be cut to the width of the edge of the felly, then wound around or partly around the wheel, and the tire replaced, the flanges keeping the paper on. Should the tire be too tight, a part of the wrapping may be removed, or more may be added to make it fit snugly.

A little straining of the tire is required to set it on a wheel that will fill it. For this purpose I have invented a "tire-setter," for which I file an application for a patent of even date herewith.

The main advantages of my vehicle-wheel are strength, durability, and convenience of adjusting the tire to shrinkage of the wheel, whereby the services of the blacksmith are dispensed with.

What I claim as my invention, and wish to secure by Letters Patent, is—

1. A vehicle-wheel tire provided with an inwardly-projecting flange at each edge, and a block integral therewith, or secured thereto, filling at each end the trough formed by said flanges, substantially as specified.

2. The tire B, provided with the flanges c, and the end blocks or hooks, C, in combination with the gained piece D, bolts E, and felly A of a wheel, substantially as specified.

JACOB P. WELLER.

Witnesses:
W. X. STEVENS,
SOLON C. KEMON.